Dec. 8, 1925.
I. H. ATHEY ET AL
1,564,461
VEHICLE
Original Filed Feb. 1, 1923
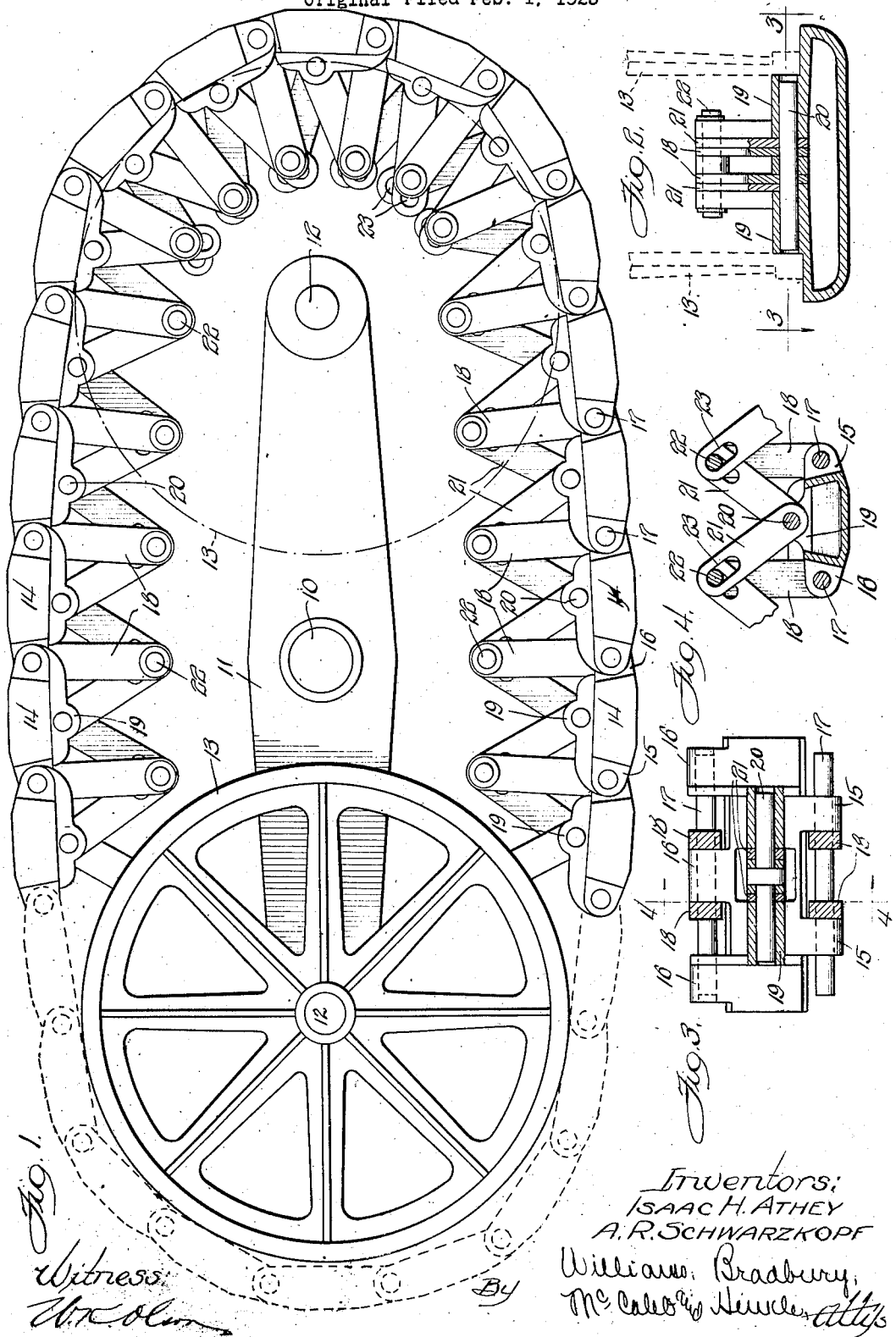
Inventors:
ISAAC H. ATHEY
A. R. SCHWARZKOPF Patented Dec. 8, 1925.

1,564,461

UNITED STATES PATENT OFFICE.

ISAAC H. ATHEY AND ARTHUR R. SCHWARZKOPF, OF CHICAGO, ILLINOIS, ASSIGNORS TO ATHEY TRUSS WHEEL CO., OF CHICAGO, ILLINOIS, A CORPORATION OF ILLINOIS.

VEHICLE.

Original application filed February 1, 1923, Serial No. 616,394. Divided and this application filed January 24, 1925. Serial No. 4,391.

*To all whom it may concern:*

Be it known that we, ISAAC H. ATHEY and ARTHUR R. SCHWARZKOPF, citizens of the United States, and residents of Chicago, in the county of Cook and State of Illinois, have invented certain new and useful Improvements in Vehicles, of which the following is a full, clear, concise, and exact description, reference being had to the accompanying drawings, forming a part of this specification.

Our invention relates to vehicles.

It relates particularly to that type of vehicle in which the load-supporting wheels roll on an endless track or chain passing around and between them.

One of the objects of this invention is to provide an improved track or chain especially adapted for use in such vehicles.

Another object is to provide an improved track or chain composed of a series of pivotally interconnected tread shoes and trussing members for stiffening the load-supporting section of track between wheels.

Another object is to provide an improved trussing structure wherein some of the members are subjected only to compression and others are subjected only to tension.

Another object is to provide a track or chain which is reliable, light, strong, and inexpensively manufactured.

Other objects and advantages will hereinafter appear.

This application is a division of our application Serial No. 616,394, filed February 1, 1923.

An embodiment of the invention is illustrated in the accompanying drawing, in which—

Fig. 1 is a side elevation of a vehicle equipped with the improved track;

Fig. 2 is a vertical transverse section through one of the track shoes;

Fig. 3 is a section on the line 3—3 of Fig. 2, and

Fig. 4 is a section on the line 4—4 of Fig. 3.

The vehicle chosen for illustration includes a load-supporting axle 10 upon each end of which is pivotally mounted a beam 11. A shaft 12 is journalled in and projects beyond the opposite sides of each beam 11 near its ends. The projecting ends of each shaft 12 carry a pair of load-supporting wheels 13. The endless track or chain passes around and between the pairs of load-supporting wheels as clearly shown in Fig. 1.

The track or chain is composed of a series of shoes 14. Each shoe has a pair of hinge lugs 15 projecting from one side and three hinge lugs 16 projecting from its opposite side. The spaces between the two outer and inner hinge lugs 16 are sufficient to receive the hinge lugs 15 of an adjacent shoe. Hinge pins 17 serve to pivotally interconnect the overlapping hinge lugs of adjacent shoes so that the shoes form a flexible endless track or chain. In order to reduce the weight of the track, the tread portions of the shoes may be made hollow, as most clearly shown in Figs. 2 and 4.

A pair of truss arms 18 are pivotally carried by each hinge pin 17 and extend inwardly therefrom. Extending transversely of the center, each shoe has a pair of elongated aligned bearing lugs 19 which carry a pivot pin 20. A pair of truss links 21 extend from each pivot pin 20 toward both of the adjacent truss arms 18 and are pivotally connected thereto by pivot pins 22. In order that the truss links 21 may be subjected to tension forces only, they are provided with slots 23 which fit over the pins 22. Thus, when the track collapses or folds as it passes around the load-supporting wheels, the pins 22 may move relatively longitudinally of the links 21 and the links are relieved of compression forces. When, however, the track is straightened out into the load-supporting position between the wheels, the pivot pins 22 lie against the inner closed ends of link slots 23 and the shoes are prevented from pivoting about their interconnecting hinges sufficiently to permit the track to deflect inwardly.

The sides of each shoe are extended so that the top surfaces thereof form treads for the load-supporting wheels, as most clearly shown in Fig. 2. The outer ends of the truss link bearing lugs 19 may serve as aligners to insure proper positioning of the load-supporting wheels.

In operation the track may easily and compactly fold or collapse as it passes around the load-supporting wheels. The lower section of track which is between the wheels is trussed or stiffened against excessive inward deflection by the cooperative action of the compression truss arms 18 and the tension truss links 21 and is thus enabled to more efficiently support the load and travel over obstructions or uneven ground.

We claim:

1. A vehicle track chain formed of a plurality of shoes, each comprising a tread member having hinge lugs projecting from the opposite sides thereof, pintles for pivotally connecting the hinge lugs of adjacent shoes, a lug extending inwardly from each tread member, a pivot pin carried by each of said lugs, inwardly extending compression links pivotally mounted on said pintles, pivot pins carried by the inner ends of said compression links, and truss links pivotally mounted on each of said first-named pivot pins and having slotted connections with the last-mentioned pivot pins of adjacent tread members.

2. A vehicle track chain formed of a plurality of shoes, each comprising a tread member having hinge lugs projecting from the opposite sides thereof, pintles for pivotally connecting the hinge lugs of adjacent shoes, a lug extending inwardly from each tread member, a pivot pin carried by each of said lugs, inwardly extending compression links mounted at the sides of said tread members, pivot pins carried by the inner ends of said compression links, and truss links pivotally mounted on each of said first-named pivot pins and having slotted connections with the last-mentioned pivot pins of adjacent tread members.

3. A vehicle track chain formed of a plurality of shoes, each comprising a tread member, the said shoes being positioned side by side and pivotally connected to form a flexible track, a lug extending inwardly from each tread member, a pivot pin carried by each of said lugs, compression links extending inwardly from said tread members, pivot pins carried by the inner ends of said compression links, and truss links mounted on each of said first-named pivot pins and having slotted connections with said last mentioned pivot pins.

4. A vehicle track comprising a series of shoes hinged together to form an endless chain, a compression member extending inwardly from each hinge between the shoes, and a pair of tension members pivoted to each shoe and having slotted connections with the adjacent compression members.

5. A vehicle track comprising a series of shoes hinged together to form an endless chain, a compression member extending inwardly from each hinge between the shoes, and a pair of tension members having slotted connection with each compression member and pivotal connection with adjacent shoes.

ISAAC H. ATHEY.
ARTHUR R. SCHWARZKOPF.